United States Patent [19]

Gilpatrick

[11] Patent Number: 4,783,977
[45] Date of Patent: Nov. 15, 1988

[54] APPARATUS FOR FORMING AND INTERRUPTING FLUID STREAMS

[75] Inventor: Michael W. Gilpatrick, Chesnee, S.C.

[73] Assignee: Milliken Research Corporation, Spartanburg, S.C.

[21] Appl. No.: 110,073

[22] Filed: Oct. 9, 1987

Related U.S. Application Data

[63] Continuation of Ser. No. 22,586, Mar. 9, 1987, abandoned, which is a continuation of Ser. No. 893,455, Aug. 7, 1986, abandoned, which is a continuation of Ser. No. 839,460, Mar. 12, 1986, abandoned, which is a continuation of Ser. No. 779,292, Sep. 19, 1985, abandoned, which is a continuation of Ser. No. 665,968, Sep. 28, 1984, abandoned.

[51] Int. Cl.⁴ .................. D06B 1/02; D06B 11/00
[52] U.S. Cl. .................. 68/205 R; 118/315; 118/325; 239/587; 239/602
[58] Field of Search .......... 68/205 R; 118/315, 325, 118/677; 239/517, 587, 602

[56] References Cited

U.S. PATENT DOCUMENTS

| | | | |
|---|---|---|---|
| 2,428,284 | 9/1947 | Krogel | 118/325 X |
| 2,785,016 | 3/1957 | Vollertzen et al. | 239/602 X |
| 3,422,827 | 1/1969 | McCulloch | 134/123 |
| 3,443,878 | 5/1969 | Weber et al. | 68/183 X |
| 3,570,275 | 3/1971 | Weber et al. | 68/183 X |
| 3,737,914 | 6/1973 | Hertz | 346/75 |
| 4,183,974 | 1/1980 | Coucher et al. | 427/181 X |
| 4,240,081 | 12/1980 | Devitt | 346/75 |

*Primary Examiner*—Philip R. Coe
*Attorney, Agent, or Firm*—George M. Fisher; H. William Petry

[57] ABSTRACT

An apparatus for forming a thin stream of fluid which intermittently strikes a target in accordance with externally supplied command data. Pressurized fluid from a manifold is passed through a relatively stiff section of tubing which is directed at the desired target. The tubing is cantilevered from the manifold, and has associated therewith a plunger which, when extended, contacts the cantilevered tube and deflects the free end of the tube. In one embodiment, the tube in its deflected position is directed at the desired target, and in its undeflected position is directed at a barrier.

5 Claims, 4 Drawing Sheets

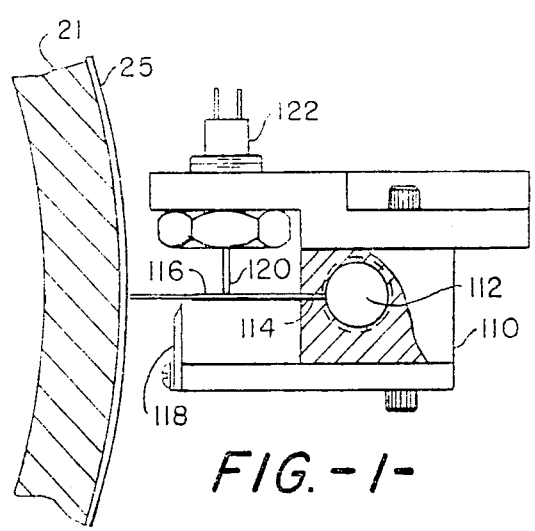
FIG.-1-
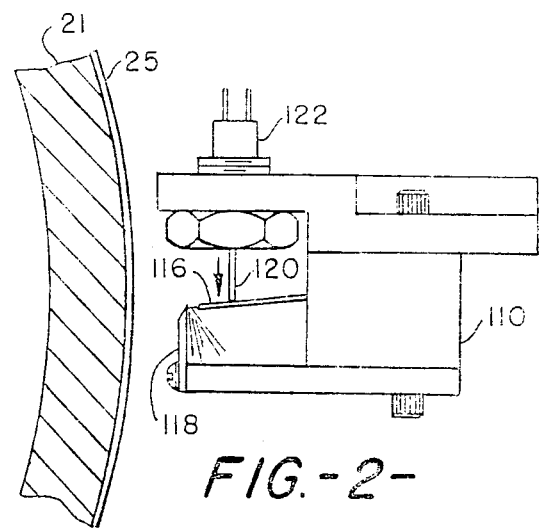
FIG.-2-
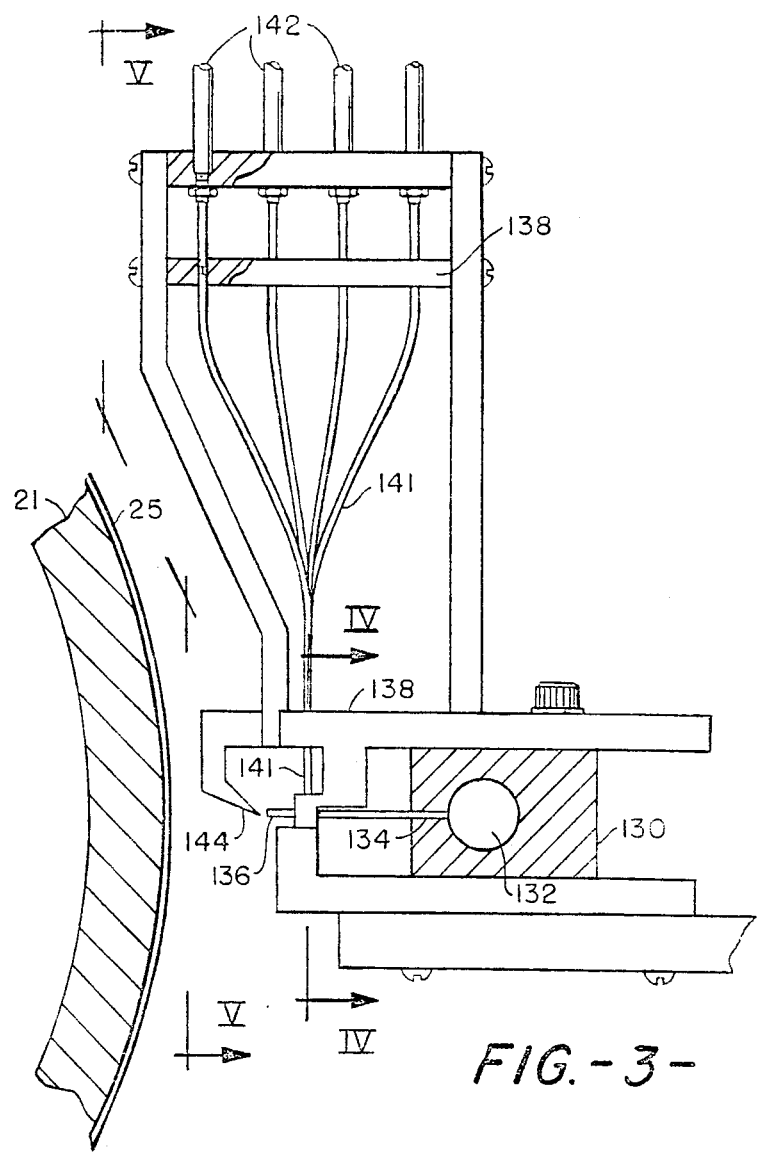
FIG.-3-

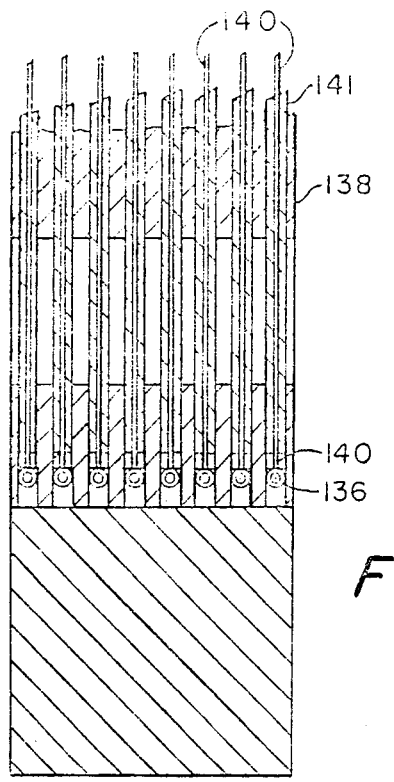
FIG.-4-
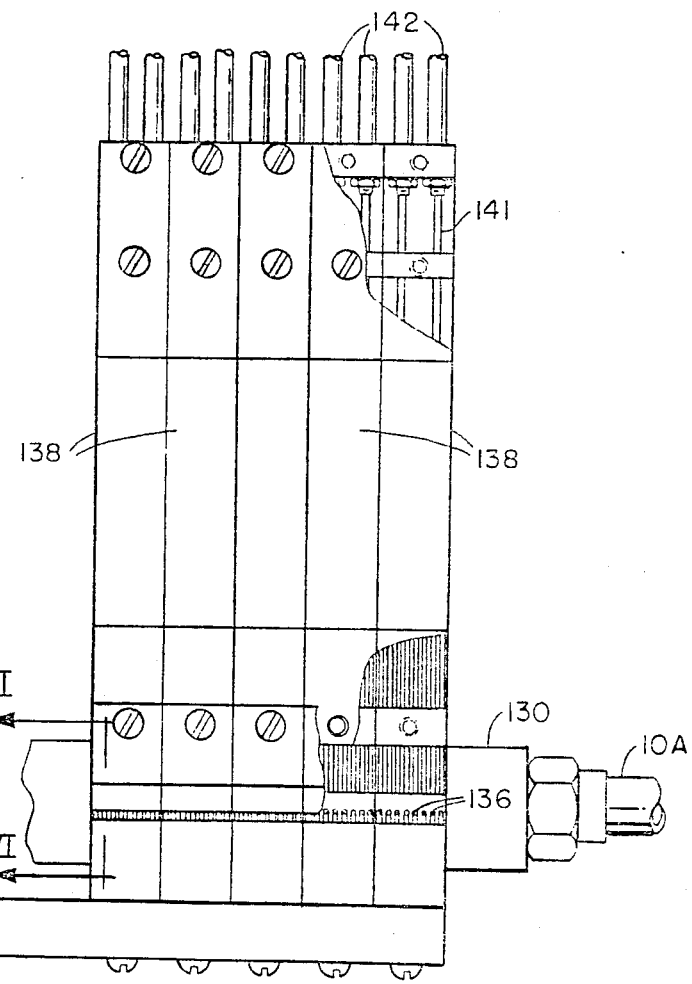
FIG.-5-

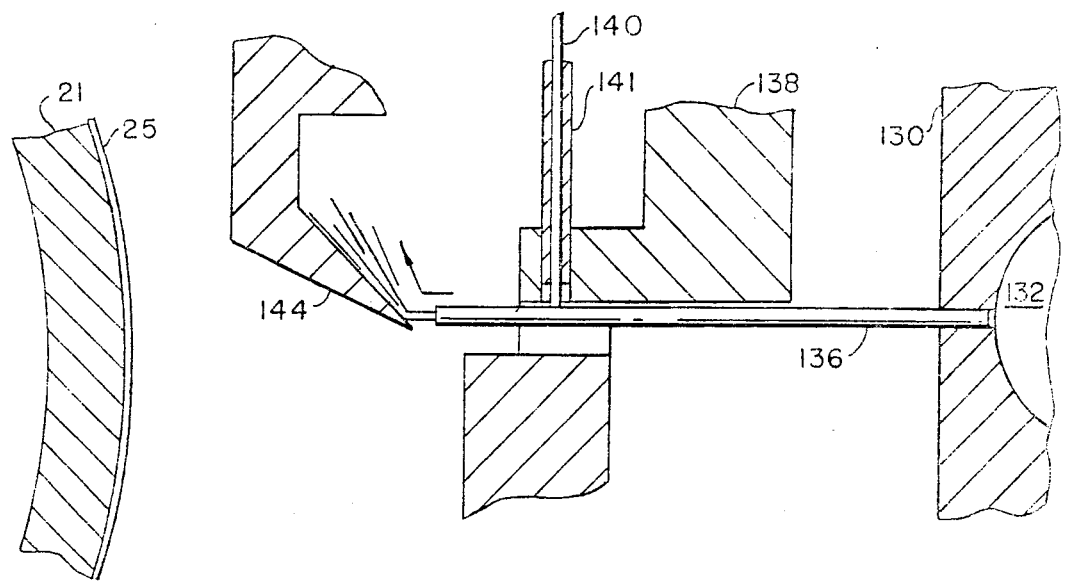
FIG.-6-
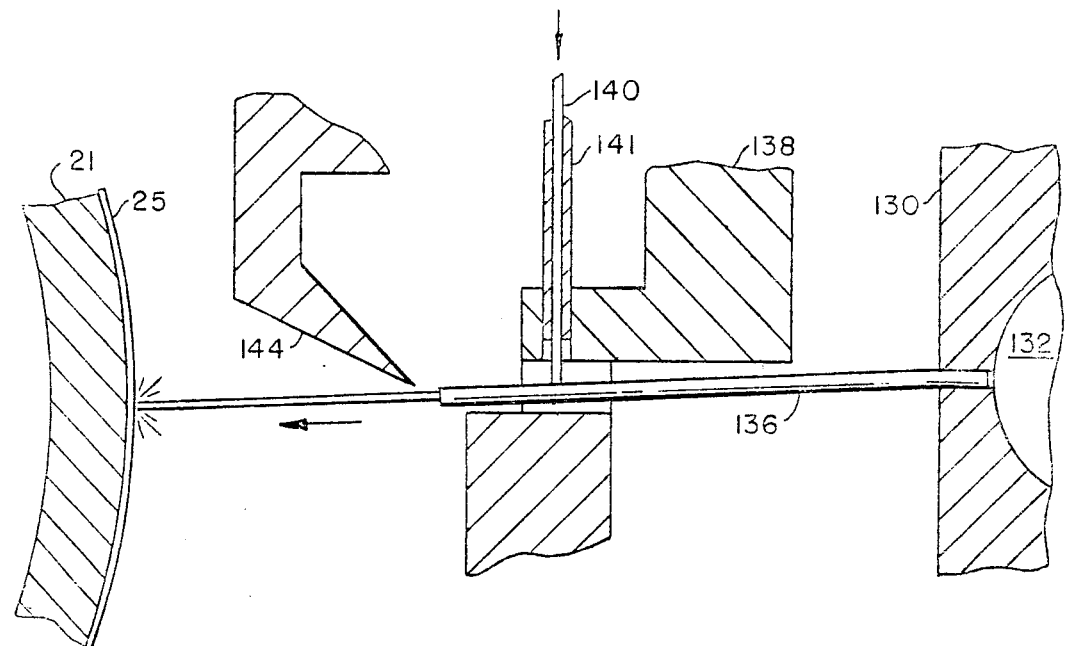
FIG.-7-

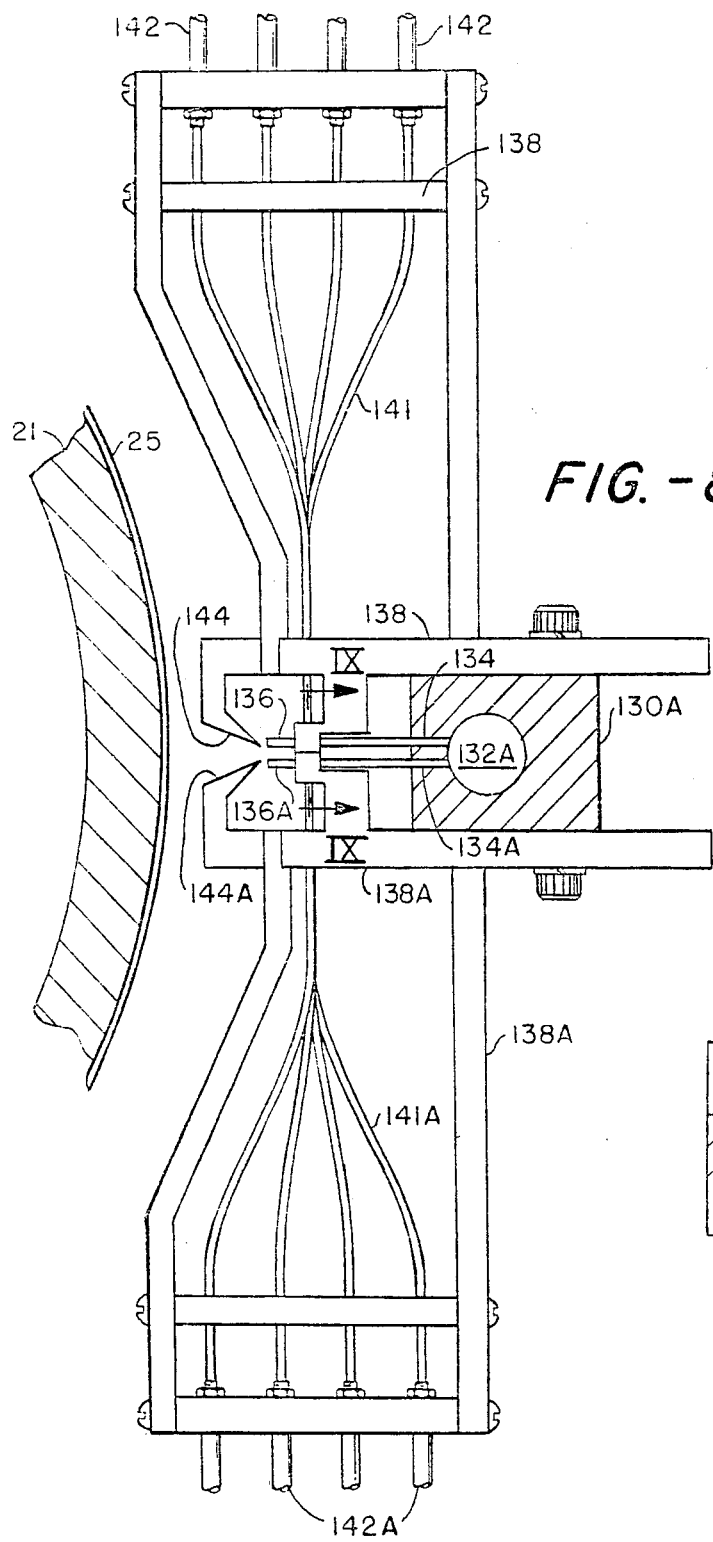
FIG.-8-
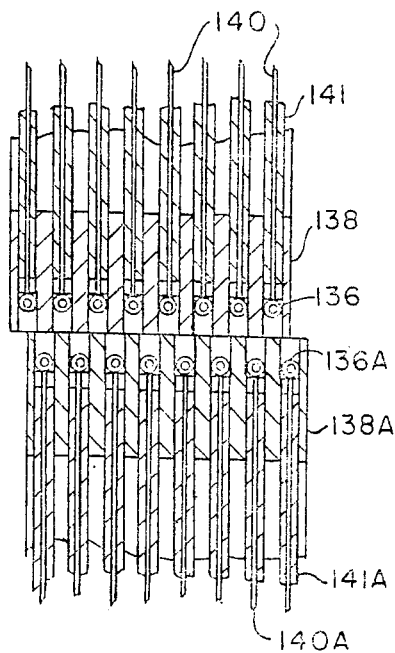
FIG.-9-

APPARATUS FOR FORMING AND INTERRUPTING FLUID STREAMS

This application is a continuation of application Ser. No. 022,586, filed Mar. 9, 1987, and now abandoned, which was in turn a continuation of application Ser. No. 893,455, filed Aug. 7, 1986, and now abandoned, which was in turn a continuation of application Ser. No. 839,460, filed Mar. 12, 1986, and now abandoned, which was in turn a continuation of application Ser. No. 779,292, filed Sept. 19, 1985, and now abandoned, which was in turn a continuation of application Ser. No. 665, 968, filed Sept. 28, 1984, and now abandoned.

This invention relates to an apparatus for forming one or more fluid streams having relatively small, well defined cross sectional areas, and for interrupting, selectively and repeatedly, the flow of such streams in response to an externally supplied signal. More specifically, this invention relates to an apparatus which may be used to form and pulse the flow of one or more such fluid streams wherein the fluid streams must be directed onto a target or substrate with a precision on the order of 0.01 inch, and wherein the streams are being formed with fluid at pressures up to or exceeding 3000 p.s.i.g. The invention disclosed herein is suitable for use with both gases and liquids, over a wide range of pressures. Because of the force necessary to deflect the tube is relatively independent of the pressure or velocity or momentum of the fluid passing therethrough, the instant invention is particularly well suited for applications where a liquid at a relatively high pressure (e.g., within th range of 30 to 3000 p.s.i.g. or more) is to be formed and controlled. In particular, the teachings of this invention have been found to be well suited to applications wherein (1) fine fluid streams, having precisely defined cross sections, are formed from fluids at relatively high pressures, (2) such streams must be directed at a target with a high degree of accuracy and precision, and (3) such streams must be repeatedly and selectively interrupted and re-established, possibly over irregular time intervals, with an extremely fast "on-off-on" response characteristic, in accordance with electronically defined and varied commands.

It is believed that the teachings of this invention may be used advantageously in a wide variety of practical applications where fine streams of fluid are formed and/or applied to a target in a non-continuous manner, and where the streams are desirably interruptible in accordance with computer-supplied commands or data. Such applications are disclosed, for example, in U.S. Pat. No. 3,443,878 to Weber, et al. and U.S. Pat. No. 3,942,343 to Klein. These processes relate to the projection of Patent No. 3 several liquid streams of dye onto a textile substrate, and diverting one or more of the streams from a path leading to the substrate into a sump in accordance with externally supplied pattern information.

It is believed that the teachings of this invention could improve significantly the degree of definition achievable with these systems as disclosed, as well as perhaps improve the extent of dye penetration or degree of visual contrast achieved with such systems.

It is also believed that the method and apparatus of this invention may be used in the field of graphic arts for the purpose of controlling a fine stream of ink and selectively projecting the stream onto a paper target in accordance with electronically generated test or graphic commands.

Yet another potential application for the teachings of the instant invention is suggested by the various U. S. patents, e.g., U.S. Pat. Nos. 3,403,862, 3,458,905, 3,494,921, 3,560,326, and 4,190,695, dealing with the treatment or manufacture of non-woven textile substrates using high velocity streams of water.

It is believed these and related processes may be made more versatile by incorporation of the teachings of the instant invention, whereby patterning is made electronically definable and variable, and whereby the substrate may be patterned with an extremely high degree of precision and accuracy, through the use of a command-actuatable plunger which deflects resilient tube which forms the fluid stream. In one position, e.g., the fully deflected position, the tube directs the stream against a target substrate, while in another position, e.g., the undeflected position, the tube directs the stream against a barrier. The invention disclosed herein is suitable for use with both gases and liquids, at a variety of pressures, but is particularly well suited for applications wherein a liquid at a relatively high pressure (e.g., within the range of 30 to 3000 p.s.i.g. or more) is to be formed and controlled.

By use of this invention, stream definition at the point of impact at the target is high. The stream is formed by the tube, and the tube is an integral part of the stream deflection scheme. Therefore, unlike some systems which require the stream to leave the stream forming means and be deflected in flight, thereby allowing the stream to diverge, the apparatus of the instant invention allows the free end portion of the stream-forming tube to be positioned quite close to the desired target, without the need to allow adequate distance for deflection of the stream in flight.

Further features and advantages of the invention disclosed herein will become apparent from a reading of the detailed description hereinbelow, and inspection of the accompanying Figures, in which:

FIGS. 1 and 2 are elevation views of an apparatus embodying the instant invention, wherein the fluid stream is formed by projecting fluid through the bore of a stiff tube which is made to extend, in cantilever fashion, from the fluid manifold. A piston or plunger is used to deflect the free end of the cantilevered tube, which allows the stream formed by the tube to be directed either onto a target work piece, or against a barrier; FIG. 2 depicts this blocking action;

FIG. 3 is an elevation view, in partial section, depicting an apparatus which may be used to control a plurality of fluid streams, where the streams are formed by passing the fluid through the bores of stiff, cantilevered tubes;

FIGS. 4 and 5 are section views taken along lines IV—IV and V—V, respectively, of FIG. 3;

FIGS. 6 and 7 are enlarged section views taken along lines VI—VI of FIG. 5 which schematically depict the stream formation and stream blocking action resulting from the cantilevered tube configuration depicted in FIGS. 3-5;

FIG. 8 is an elevation view, in partial section, of an embodiment of the invention depicted in FIG. 3, wherein a multiple-tube array permits a greater linear density of streams along the axis of roll 21;

FIG. 9 is a section view taken along lines IX—IX of FIG. 8, showing the offset positioning of the opposing arrays of tubes..

FIGS. 1 and 2 depict various views of an apparatus embodying the instant invention, which may be used to interrupt the impact of a thin stream of fluid in accordance with externally supplied command information such as digitized electrical signals. In this apparatus, the thin stream of fluid is formed by passing the fluid through a stiff, cantilevered thin walled tube which is mechanically deflected by means of a piston or other means acting near the cantilevered end of the tube to direct the fluid against a barrier rather than against the target.

A conduit supplies the desired fluid (the "working" fluid) at the desired pressure and flow rate, via a suitable connector, to cavity block 110. Within block 110 is manifold or cavity 112. A passage 114 is drilled or otherwise placed in the side of block 110; this passage is sized to accommodate a stiff, thin walled tube 116 which has a bore size and shape corresponding to the size and shape of the desired fluid stream to be produced. If desired, block 110 may be made in the form of two mating halves, so that the passage 114 may be formed by machining a groove in the face of one or both halves rather than by drilling a hole. Tube 116, which may be made of stainless steel or other suitable material, is inserted into passage 114 and securely affixed therein to assure that the pressures associated with the working fluid will not dislodge the tube or cause leakage of the working fluid. Tube 116 is made to protrude from passage 114 in the direction of the target 25 a sufficient distance to permit the deflection of the free or distal end portion of tube 116 through a small angle without damage to tube 116. Closely associated with tube 116 is plunger 120, which in the Figures is positioned near the cantilevered or distal end of tube 116, and which is adjusted so as to cause a deflection of tube 116 whenever plunger 120 is extended. In certain applications, a different positioning of plunger 120 relative to tube 116 may be preferred. Barrier plate 118 is securely affixed slightly forward of the distal end of tube 116, and extends toward the path of the fluid stream far enough that the fluid jet formed by tube 116 strikes the upper portion of plate 118 whenever tube 116 is deflected by plunger 120, as shown in FIG. 2. Whenever tube 116 is not deflected, the resulting jet passes over the upper portion of barrier plate 118, as depicted in FIG. 1. If desired, the configuration of barrier plate 118 may be inverted so that the jet passes over the edge of barrier plate 118 only when tube 116 is deflected. Associated with barrier plate 118 are drains, not shown, for carrying the deflected fluid away for disposal or recycling. Plunger 120 may be actuated in a conventional manner by an electrical solenoid, a pneumatic valve and cylinder, or other means, depicted 122. Optionally, the end of plunger 120 which makes contact with tube 116 may be formed to accommodate the contour of tube 116, i.e., may be formed to surround or grip, partially or completely, tube 116; it is preferred that, regardless of the contour of the end portion of plunger 120, the stroke of plunger 120 be adjusted so that plunger 120, when not deflecting tube 116, extends to a point closely adjacent to or in contact with tube 116, so that when plunger 120 is extended to deflect tube 116, little motion will be lost and unwanted oscillations will be minimized.

FIGS. 3 through 7 depict an apparatus related in operation to the apparatus of FIGS. 1 and 2, but suitable for controlling an array of jets formed in the manner depicted in FIGS. 1 and 2. Looking first at FIGS. 3 and 5, the working fluid is introduced into a generally cylindrical inlet cavity or manifold 132 formed along the length of orifice block 130, via conduit 10A (FIG. 5) and a suitable threaded connector. Tubes 136, each having the desired inside dimensions and positioned generally perpendicularly to the surface of target 25, are securely affixed in passages 134 in orifice block 130 which conform to the outside dimensions of tubes 136. By means of tubes 136 and passages 134, the pressurized fluid contained within cavity 132 may be directed through tubes 136 in the direction of the surface of target 25.

It is preferred, but not necessary, that tubes 136 extend through passages 134 to cavity 132, and that tubes 136 be secured within passages 134 by soldering the tubes directly to orifice block 130, by soldering a collar to the tube which fits snugly within a machined recess in block 130, or by other suitable means. Tubes 136 should be of such design, and should extend far enough from orifice block 130, so that deflections of tubes 136 through small angles by the action of plungers 140 will not cause permanent deformation of tubes 136.

Securely positioned a short distance from orifice block 130 is deflection frame 138, through which, are fed flexible deflecting plungers 140 sheathed by hollow plunger guides 141. Plungers 140 may be constructed of stainless steel or other suitable material; plunger guides 141 may be tubes of appropriate bore size, made of any suitable material having the necessary flexibility to allow for desired bending and shaping. Each plunger 140 and plunger guide 141 is associated with a respective individual tube 136 and is precisely aligned by deflection frame 138. Each plunger 140 is adjusted to make contact with its respective tube 136 even when that tube is in its undeflected position, as shown in FIGS. 4 and 6. By maintaining such contact, the time response is improved, vibrations induced by impact between plungers 140 and respective tubes 136 are eliminated, and other vibrations or oscillations along tube 136 are dampened. Deflection frame 138 may also serve as a guide to align the movement of tubes 136 during deflection and recovery, as shown in FIG. 4. Plungers 140 are actuated by valves 142 which, because of their relative bulk, are situated somewhat remotely from the point at which plungers 140 act on tubes 136. For convenience, deflection frame 138, as shown in FIGS. 3 and 5, may be made to accommodate eight separate valve/plunger assemblies, and, together with a section of orifice block 130 containing eight tubes 136, may form a fluid control module which may be juxtaposed, as in FIG. 5 to allow simultaneous treatment over a relatively wide target surface.

In operation, as shown in FIGS. 6 and 7, when one of plungers 140 is unextended, i.e., when one of tubes 136 is undeflected, the pressurized working fluid passes through tube 136 from cavity 132 and strikes barrier lip 144, where the fluid jet is deflected and dissipated. By extending plunger 140 via corresponding associated valve 142 and plunger guide 141, as in response to pattern information supplied to valve 142, tube 136 is deflected slightly—not enough to cause permanent deformations in tube 136, but sufficient to permit the fluid jet formed by tube 136 to clear barrier lip 144 and pass on in the direction of target 25, as depicted in FIG. 7.

FIGS. 8 and 9 depict an apparatus similar to that shown in FIGS. 3 through 5, for use where increased jet density (i.e., number of jets per linear distance across the face of roll 21) is desired. In this configuration, twice the jet density of the apparatus of FIGS. 3 through 5 may be achieved. In this configuration, two parallel arrays of tubes 136, 136A, are inserted into orifice block 130A via passages 134, 134A and communicate with chamber or manifold 132A. The deflection frame 138, array of plungers 140, plunger guides 141, arrangement of valves 142, and placement of barrier lip 144 of FIG. 3 have been substantially duplicated at 138A, 140A, 141A, 142A and 144A, respectively, to achieve an "over/under" apparatus which, in FIG. 8 appears to be an almost mirror-image combination of the apparatus configuration of FIG. 3. The opposing tube arrays 136, 136A and deflection frames 138, 138A, however, are offset or laterally displaced, as shown in FIG. 9, to permit uniform positioning of the additional jets in the direction of the axis of roll 21. It should be noted that, as deflected, the tubes 136, 136A from the upper and lower arrays of FIG. 9 will not form a straight line along the axis of roll 21. This staggered alignment is intended to compensate for the non-normal orientation of the tubes 136, 136A to the surface of roll 21 in their deflected position. The small angle induced by the action of plungers 140, 140A will cause, upon proper adjustment of the overall distance to the surface of roll 21, the plunger extension length, etc., the jets emitted by the staggered tubes 136, 136A to strike the surface of a target 25 placed against roll 21 in substantially perfect alignment.

I claim:

1. An apparatus for forming a thin stream of fluid which intermittently strikes a target in accordance with externally supplied command data, comprising:
   a. a manifold for containing and distributing said fluid at a desired pressure;
   b. stream forming means in fluid communication with said manifold, said stream forming means comprising a relatively stiff section of tubing which is directed at said target and which is cantilevered from said manifold and is in fluid communication therewith, said tubing being capable of undergoing moderate deflection without permanent deformation;
   c. a barrier means extending beyond the proximal end of said tube and extending transversely to the direction of said stream path, said barrier means serving to intersect the path of said stream when said tube is in a deflected position, and positioned to allow said stream to pass substantially unchanged and strike the target when said tube is in an undeflected position; and
   d. tube deflection means comprising a plunger which, when extended, contacts said cantilevered tube and deflects distal end of said tube a sufficient amount to cause said stream issuing from said tube to strike a portion of said barrier means.

2. An apparatus for forming a thin stream of fluid which intermittently strikes a target in accordance with externally supplied command data, comprising:
   a. a manifold for containing and distributing said fluid at a desired pressure;
   b. stream forming means in fluid communication with said manifold, said stream forming means comprising a relatively stiff section of tubing which is directed at said target and which is cantilevered from said manifold and is in fluid communication therewith, said tubing being capable of undergoing moderate deflection without permanent deformation;
   c. a barrier means extending beyond the proximal end of said tube and extending transversely to the direction of said stream path, said barrier means serving to intersect the path of said stream when said tube is in an undeflected position, and positioned to allow said stream to pass substantially unchanged and strike the target when said tube is in an deflected position; and
   d. tube deflection means comprising a plunger which, when extended, contacts said cantilevered tube and deflects the distal end of said tube a sufficient amount to cause said stream issuing from said tube i pass said barrier means substantially unchanged and strike said target.

3. The apparatus of claim 1 wherein said tube deflecting means comprises a plunger which contacts the distal portion of said tube at all times.

4. The apparatus of claim 3 wherein said plunger is attached to said tube.

5. An apparatus for forming an array of thin streams of fluid which intermittently strike a target in accordance with externally supplied command data, comprising:
   a. a manifold for containing and distributing said fluid at a desired pressure;
   b. stream forming means, in fluid communication with said manifold, said stream forming means comprising an array of relatively stiff sections of tubing which are directed at said target and which are cantilevered from said manifold, said tubes being capable of undergoing moderate deflection without permanent deformation, said tubes being arranged in two generally parallel arrays, said arrays being laterally offset so that respective tubes from each array are unopposed;
   c. a barrier means for each array extending beyond the distal end of said tubes in each array and extending transversely to the direction of said stream path, said barrier means serving to intersect the path of any of said streams when the respective stream-forming tube is in an undeflected position, and configured to allow said stream to pass substantially unchanged when said tube is in a deflected position;
   d. tube deflecting means, comprising a plurality of plungers arranged in two generally parallel arrays, said arrays being laterally offset so that respective plungers from each array are unopposed, each individual plunger being associated with a corresponding cantilevered tube in said stream forming means, and being positioned to contact the distal portion of said tube and deflect the distal end of said tube a sufficient amount to cause said stream associated with said tube to pass said barrier means substantially unchanged and strike said target.

* * * * *